(12) United States Patent
Lee et al.

(10) Patent No.: US 8,675,556 B2
(45) Date of Patent: Mar. 18, 2014

(54) METHOD OF TRANSMITTING DATA FRAME TO MULTI-USER IN WIRELESS COMMUNICATION SYSTEMS

(75) Inventors: Yu-Ro Lee, Daejeon (KR); Yun-Joo Kim, Suwon-si (KR); Jong-Ee Oh, Daejeon (KR); Minho Cheong, Daejeon (KR); Sok-Kyu Lee, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 486 days.

(21) Appl. No.: 13/046,423

(22) Filed: Mar. 11, 2011

(65) Prior Publication Data

US 2011/0222478 A1   Sep. 15, 2011

(30) Foreign Application Priority Data

Mar. 12, 2010 (KR) .................. 10-2010-0022456

(51) Int. Cl.
*H04W 4/00* (2009.01)
(52) U.S. Cl.
USPC .......................................... 370/328
(58) Field of Classification Search
USPC ............. 370/310.2, 310, 312, 313, 328, 338, 370/331, 346, 332, 431
See application file for complete search history.

(56) References Cited

U.S. PATENT DOCUMENTS

| 7,965,687 B2 * | 6/2011 | Varikat ..................... 370/334 |
| 2011/0019573 A1 * | 1/2011 | Ezri .............................. 370/252 |

FOREIGN PATENT DOCUMENTS

KR   10-2010-0017117 A   2/2010

* cited by examiner

*Primary Examiner* — Anh Ngoc Nguyen

(57) ABSTRACT

Provided a method for simultaneously transmitting data frames to a plurality of STAs in a multi-user based wireless communication system. The method includes: requesting sounding or feedback for the plurality of STAs by using a first control information frame containing first group information; receiving responses to the sounding or feedback request; reconfiguring the plurality of STAs composing the first group into a plurality of second groups on the basis of the responses such that the sum of maximum transport streams of the respective STAs composing one group becomes equal to or less than the maximum number of streams transmitted by an AP; transmitting a second control information frame containing second group information on the respective second groups to the plurality of STAs composing the first group; and transmitting data frames by using the second group information.

16 Claims, 9 Drawing Sheets

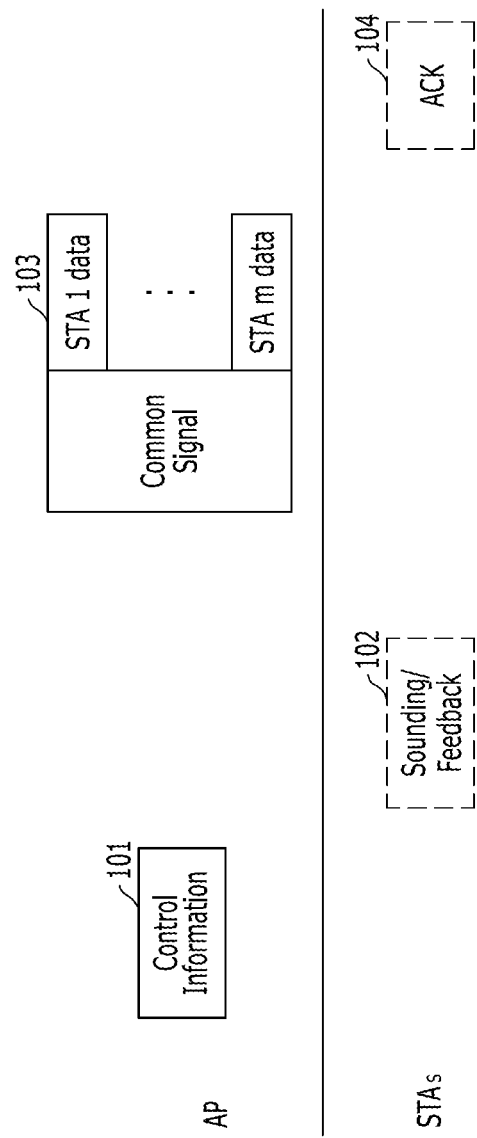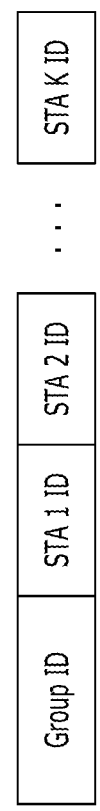

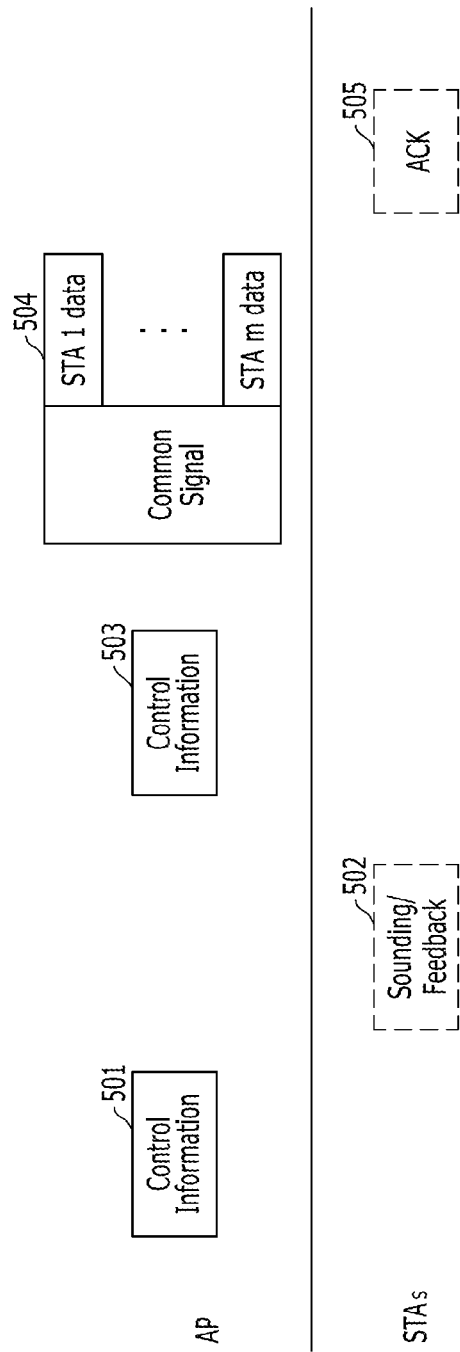

METHOD OF TRANSMITTING DATA FRAME TO MULTI-USER IN WIRELESS COMMUNICATION SYSTEMS

CROSS-REFERENCE(S) TO RELATED APPLICATIONS

The present application claims priority of Korean Patent Application No. 10-2010-0022456, filed on Mar. 12, 2010, which is incorporated herein by reference in its entirety.

BACKGROUND OF THE INVENTION

1. Field of the Invention

Exemplary embodiments of the present invention relate to a method for transmitting data frames to multi-user in a wireless communication system; and, more particularly, to a method capable of reconfiguring a group according to the channel states of plural stations (STAs) and the size of data to be transmitted and deciding transport stream numbers of the STAs composing the group such that the transport stream numbers of the respective STAs, which are contained in a signal field, may be expressed as a minimum bit number, in a multi-user based wireless communication system.

2. Description of Related Art

In general, a wireless communication system such as wireless LAN includes a plurality of access points (AP) connected to each other through a network. A plurality of STAs included in a basic service set (BSS) managed by one AP simultaneously transmit and receive frames to and from the AP. Meanwhile, an independent BSS (IBSS) includes a plurality of STAs, and one STA simultaneously transmits and receives frames to and from the other STAs.

Recently, much attention has been paid to not only MIMO (Multiple Input Multiple Output) technology for transmitting multiple streams only to one STA, but also MU-MINO (Multi-User MIMO) technology for transmitting multiple streams to a plurality of users.

The MU-MIMO technology refers to a method in which an AP removes the interference between a plurality of STAs to transmit data, and may acquire even a multi-user diversity gain with an increase in channel capacity of multiple antennas. The MU-MIMO technology may simultaneously transmit multiple streams to multiple users by using the same frequency band. Therefore, the MU-MIMO technology may efficiently improve throughput while increasing the complexity of the AP.

In order to increase the efficiency of an information transmission method in a wireless communication system to which the MU-MIMO is applied, a plurality of STAs within an AP may be mapped into a plurality of groups by using information such as channel characteristics. The group information in such an AP may be transmitted to the STAs such that each of the STAs may recognize a group to which the STA belongs and its order within the group.

FIG. 1 is a diagram explaining a conventional process for transmitting a data unit in the above-described wireless communication system.

Referring to FIG. 1, the AP transmits information through a control information frame 101. The information may include information which is required when the plurality of STAs transmit channel sounding/channel feedback Sounding/Feedback 102 and information which is required for receiving data. In other words, the AP requests channel sounding or channel feedback for the plurality of STAs by using the control information frame 101.

Each of the STAs receiving the control information frame 101 from the AP transmits channel information to the AP in response to the channel sounding or channel feedback request (102). At this time, the STA may divide the channel information in a temporal or spatial manner to transmit the channel information or divide the channel information for each sub-carrier to transmit the channel information.

The AP receiving the channel information from the respective STAs decides the number of STAs capable of simultaneously transmitting data and transport stream numbers for the respective STAs, by considering the correlation between channels and/or the QoS (Quality of Service) of data. Furthermore, the AP transmits data frames for the respective STAs with the information on the STAs which are to simultaneously transmit data (103). Here, the AP transmits the information on the STAs which simultaneously transmit data and the information on transport stream numbers for the respective STAs to the STAs through a common signal which may be received by all the STAs.

Each of the STAs receiving the data frames demodulates the received data frame by using the information on the STAs which simultaneously transmit data and the information on the transport stream numbers for the respective STAs, which are contained in the common signal transmitted from the AP. Then, the STA checks whether or not an error occurred in the received data, and transmits an ACK frame indicating a check result to the AP.

When an AP simultaneously transmits frames to a plurality of STAs, it is referred to as multi-user transmission. In order to perform the multi-user transmission, the AP allocates the plurality of STAs existing within its region as a plurality of groups, based on channel characteristics and the QoS. The information on the allocated groups is transmitted to the respective STAs through a control information frame of a MAC layer.

FIG. 2 shows an example of a group definition field contained in the control information frame for informing the respective STAs of the group information.

A group identifier (ID) Group ID having arbitrary y bits is used to specify K STAs (K is a natural number, for example, K≤4) according to a specific sequence. The group ID is defined by the AP and transmitted to the STAs. A plurality of group IDs Group ID may be allocated to one STA. That is, one STA may belong to a single group or a plurality of groups.

The group definition field includes information on STAs belonging to one group ID Group ID and the sequence of the STAs. Referring to FIG. 2, the group definition field includes a group ID having arbitrary y bits and ID information STA 1 ID to STA K ID of STAs belonging to the same group. Each of the STAs may recognize the group ID of the group to which the STA belongs and the order of the STA within the group, when receiving the group definition field. Since the transport stream numbers of the respective STAs for each group are required for demodulating a long training field (LTF) for channel estimation, the information on the transport stream numbers of the STAs should be contained in control information for data transmission.

In a recent VHT (Very High Throughput) wireless LAN system, the MU-MIMO technology is applied to consider a protocol data unit (PPDU) format as shown in FIG. 3.

FIG. 3 shows a PPDU format in an environment in which legacy STAs, HT (High Throughput) STAs, and VHT STAs are mixed. Referring to FIG. 3, the VHT PPDU includes training symbol fields L-STF and L-LTF for legacy STAs, a legacy-STA signal field L-SIG, a signal field VHT-SIG-C for VHT STAs which may be decoded by all STAs, training symbol fields VHT-STF and VHT-LTF for VHT STAs, a VHT-STA signal field VHT-SIG-D which may be decoded only by VHT STAs, and a data field Data.

In FIG. 3, fields from the training symbol field L-STF to the signal field VHT-SIG-C may be received by the VHT STAs as well as the legacy STAs and the HT STAs, and the following fields from the training symbol field VHT-STF may be received only by the VHT STAs. Therefore, the transport stream numbers (LTF symbol numbers) of all the VHT STAs within the group should be contained in the signal field VHT-SIG-C by using predetermined bits, a predetermined modulation scheme, and a predetermined coding scheme.

When the number of STAs composing a group which is divided for multi-transmission is set to K, a value obtained by summing the numbers of transport streams which may be transmitted by K STAs is smaller than the number of streams which may be simultaneously transmitted by the AP. For example, when it is assumed that the number of STAs composing one group is eight and each of the STAs may transmit a maximum of four streams, the maximum number of transport streams which may be transmitted by eight STAs composing the group becomes 32.

When it is assumed the STAs know only the group information from the control information frame transmitted from the AP, all possible combinations of the numbers of transport streams which may be transmitted by the eight STAs composing the group should be transmitted to the STAs through a common signal. All the possible combinations of the numbers of transport streams which may be transmitted by the eight STAs composing the group may include a plurality of cases from a case in which no stream is transmitted to a case in which the maximum of four streams are transmitted.

That is, each of the STAs may receive any one transport stream from 0 to 4. Considering such a case, three bits are required to express the transport stream number for each STA. When it is assumed that the transport stream information is transmitted to each STA, the information to be contained in the signal field VHT-SIG-C should have a bit number shown in FIG. 4. FIG. 4 shows the bit number for expressing the transport stream number of each STA, when the number of STAs composing one group is eight. In this case, a total of 24 bits are required to express the transport stream numbers of all the STAs within the group.

In the multi-user transmission, multi-user diversity will increase as the number of STAs within the group increases. The increase in the number of STAs composing the group may cause an increase in the number of bits representing the transport stream numbers of the respective STAs, which are to be contained in the signal field VHT-SIG-C. In general, the total bit number of the signal field VHT-SIG-C is fixed, and the signal field VHT-SIG-C includes a variety of different information as well as group information. Therefore, a transport stream number field defining the transport stream numbers of the STAs corresponding to a group ID needs to be simply expressed by using a small bit number.

SUMMARY OF THE INVENTION

An embodiment of the present invention is directed to a method for transmitting data frames to multi-user, which is capable of reconfiguring a group according to the channel states of plural STAs and the size of data to be transmitted and deciding transport stream numbers of the STAs composing the group such that the transport stream numbers of the respective STAs, which are contained in a signal field, may be expressed as a minimum bit number, in a multi-user based wireless communication system.

In accordance with an embodiment of the present invention, there is provided a method for simultaneously transmitting data frames to a plurality of STAs in a multi-user based wireless communication system. The method includes: requesting sounding or feedback for the plurality of STAs by using a first control information frame containing first group information; receiving responses to the sounding or feedback request; reconfiguring the plurality of STAs composing the first group into a plurality of second groups on the basis of the responses such that the sum of maximum transport streams of the respective STAs composing one group becomes equal to or less than the maximum number of streams transmitted by an AP; transmitting a second control information frame containing second group information on the respective second groups to the plurality of STAs composing the first group; and transmitting data frames by using the second group information.

In accordance with another embodiment of the present invention, there is provided a method for simultaneously transmitting data frames to a plurality of STAs in a multi-user based wireless communication system. The method includes: receiving responses to a sounding or feedback request from the plurality of STAs; grouping the plurality of STAs on the basis of the responses such that the sum of maximum transport stream numbers of the respective STAs composing one group becomes equal to or less than the maximum number of streams transmitted by an AP, and configuring one or more first groups; transmitting a control information frame containing information on the first groups to the plurality of STAs; and transmitting data frames by using the information on the first groups.

The transport stream numbers of the respective STAs which are decided on the basis of channel information for each STA received in response to the sounding or feedback request and the size of data to be transmitted may be used to configure the groups such that the sum of the transport stream numbers of the respective STAs composing the one group becomes equal to or less than the maximum number of streams transmitted by the AP.

The group information may include group identifiers (ID), information on a plurality of STAs composing the groups, and the maximum transport stream numbers for the respective STAs.

The maximum transport stream numbers for the respective STAs may be set to be different from each other.

The group IDs and the transport stream numbers allocated to the respective STAs composing the groups in the group information may be contained in a common signal during a data transmission period to transmit the data frames to the respective STAs, and the transport stream numbers allocated to the respective STAs may be decided within the maximum transport stream numbers of the respective STAs.

The data frames transmitted to the plurality of STAs composing the second groups during the data transmission period may be transmitted as a plurality of PPDUs (PLCP (Physical Layer Convergence Procedure) Protocol Data Unit).

A PPDU containing the data frames transmitted to the respective groups may be transmitted through a plurality of data transmission periods.

The control information frame containing the group information on the respective second groups is transmitted one time to the plurality of STAs composing the first group at an arbitrary time before the data frame transmission.

In accordance with the embodiments of the present invention, a group is reconfigured according to the channel states of the plurality of STAs and the size of data to be transmitted, and the transport stream numbers of the STAs composing the group are decided. Accordingly, the bit number of the transport stream number field VHT-SIG-C defining the transport stream numbers used by the STAs within the group may be optimized and used, which makes it possible to increase the bit use depending on the transport stream number field VHT-SIG-C.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

BRIEF DESCRIPTION OF THE DRAWINGS

FIG. 1 is a diagram explaining a conventional multi-user transmission method.

FIG. 2 is a diagram showing a conventional control information transmission format for multi-user transmission.

FIG. 5 is a diagram explaining a multi-user transmission method in accordance with an embodiment of the present invention.

FIG. 6 is a diagram showing a control information transmission format for multi-user transmission in accordance with the embodiment of the present invention.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In general, the number of transmission antennas of an AP is limited by the structure or complexity of a transmitter. Accordingly, the number of streams which may be simultaneously transmitted by the AP is also limited. Exemplary embodiments of the present invention provide a technology for efficiently transmitting multi-user information to STAs, which is capable of preventing an increase in a bit number indicating stream numbers of the respective STAs, which are to be contained in a common signal field VHT-SIG-C although the number of STAs within a group increases.

FIG. 5 is a diagram explaining a multi-user transmission method in accordance with an embodiment of the present invention. An AP transmits information through a control information frame 501. The information may include information required when the plurality of STAs transmit channel sounding/channel feedback Sounding/Feedback 102 or receive data and information required for receiving data. In other words, the AP requests channel sounding or channel feedback for the plurality of STAs by using the control information frame 501.

The information frame 501 transmitted by the AP includes a group ID Group ID, IDs STA 1 ID to STA K ID of STAs composing a group, maximum transport stream numbers Msk which may be transmitted by the respective STAs. The maximum transport stream numbers Msk which may be transmitted by the respective STAs represent the maximum numbers of transport streams which may be transmitted by K STAs.

Each of the STAs receiving the control information frame 501 from the AP may recognize the group to which the STA belongs and the number of streams which are to be subjected to channel sounding or channel feedback. The STA transmits channel information to the AP in response to the channel sounding or channel feedback request (502). At this time, the STA may divide the channel information in a temporal or spatial manner to transmit the channel information or divide the channel information for each subcarrier to transmit the channel information.

Figure 3:
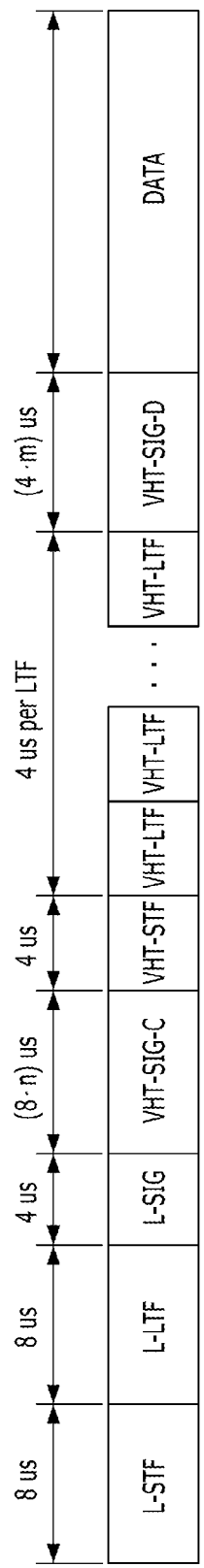
FIG. 3 is a diagram showing a conventional protocol data unit for VHT STAs.
Figure 4:
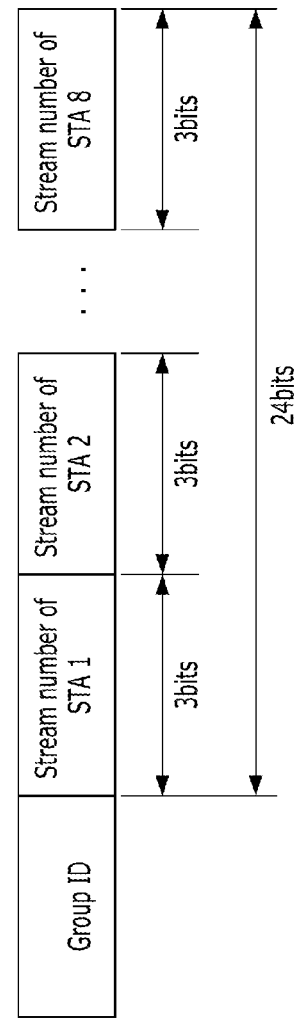
FIG. 4 is a diagram explaining a bit number indicating transport stream numbers of STAs within a group, which is contained in a VHT-SIG-C field.
Figure 7:
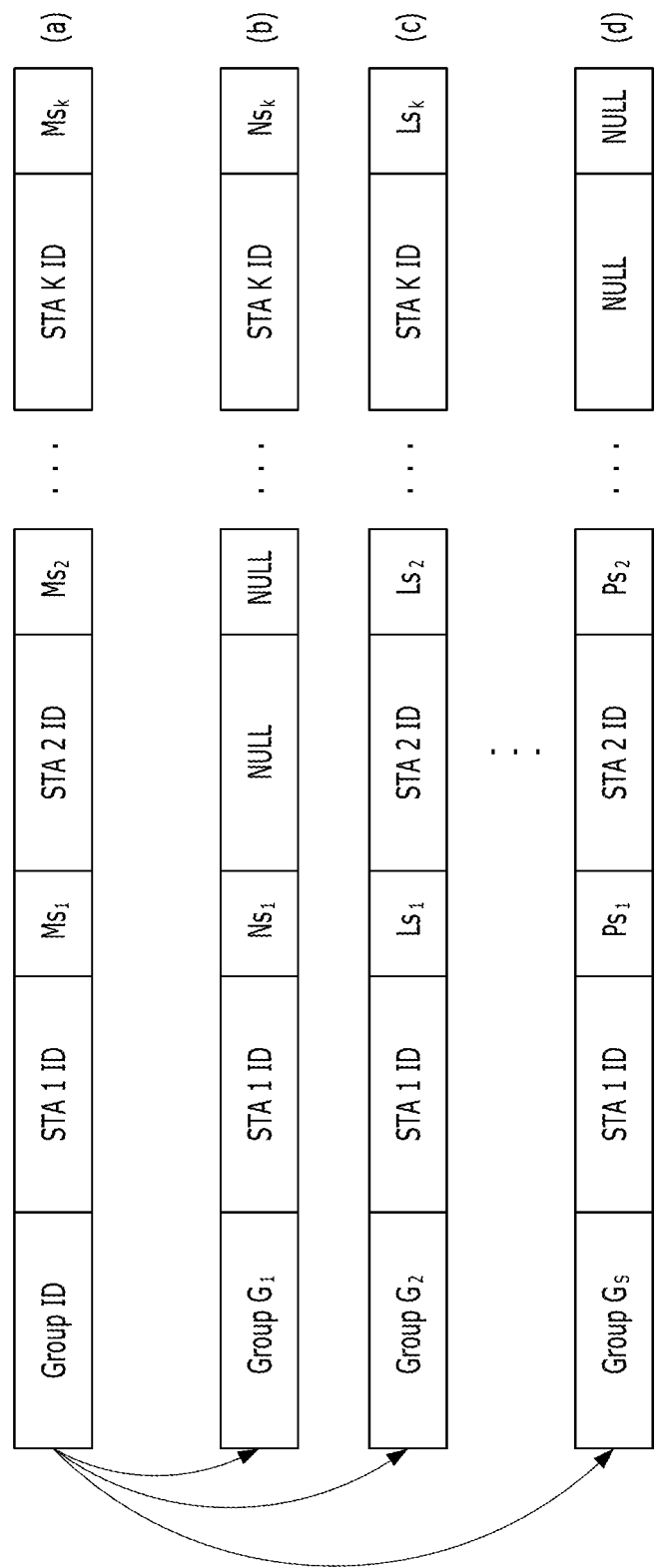
FIG. 7 is a diagram explaining a group reconfiguration process in accordance with the embodiment of the present invention.

The AP receiving the channel information from the respective STAs configures new groups as shown in FIG. 7, by deciding STAs suitable for simultaneous transmission and the number of streams for each STA, in consideration of the channel information and information such as the size of data to be transmitted.

FIG. 7 is diagrams explaining a group reconfiguration process in accordance with the embodiment of the present invention. A (a) of FIG. 7 shows the information contained in the control information frame 501 of FIG. 5, that is, a frame shown in FIG. 6. (b) to (d) of FIG. 7 represent new group configurations which are decided by combining STAs which may simultaneously transmit streams in a current channel state and the stream numbers of the respective STAs, by using the channel information transmitted through the channel sounding or channel feedback and the size of data to be transmitted.

In FIG. 7, group identifiers Group $G_1$, Group $G_2$, and Group $G_s$ are unique group IDs which are newly allocated by the AP, and have different values from each other. Furthermore, the sum of the transport stream numbers of the respective STAs within the reconfigured group is equal to or less than the number of streams which may be simultaneously transmitted by AP. Furthermore, when a bit for indicating the number of STAs composing a group is allocated in FIG. 7, a portion represented by NULL may be removed to reduce a bit number of the group-related information of the common signal. As such, after the channel information and the size of data to be transmitted are used to reconfigure the STAs which may simultaneously transmit streams in a current channel state and the transport stream numbers for the respective STAs, the reconfigured group information is transmitted to the respective STAs through the control information frame 503 of FIG. 5.

Then, information on a common signal 504 is configured by using the newly-configured group information. Accordingly, the method in accordance with the embodiment of the present invention may reduce the bit number representing the transport stream numbers for the respective STAs, which are to be contained in the common signal. A process (504) of transmitting data frames for the respective STAs by using the newly configured group information may be performed in the same manner as in the conventional method.

The STAs receiving the data frames demodulate the received data frames by using the information of the STAs transmitting streams at the same time and the transport stream numbers for the respective STAs, which are contained in the common signal transmitted from the AP. Then, the respective STAs check whether or not an error occurred in the received data, and transmit an ACK frame indicating the check result to the AP (505).

Hereinafter, specific examples will be taken to describe a process in which groups are reconfigured to transmit streams, in accordance with the embodiment of the present invention.

For example, it may be assumed that the number of STAs requesting sounding or feedback is eight, the respective STAs request sounding or feedback for a maximum of four streams, the maximum number of STAs to which streams may be simultaneously transmitted by the AP is four, and the total number of streams which may be simultaneously transmitted is eight.

Furthermore, when the number of groups obtained by reconfiguring STAs which may simultaneously transmit streams in a current channel state by using the channel information and the size of data to be transmitted is three, the transport stream numbers of the STAs within the respective reconfigured groups are assumed as shown in Table 1 below.

In Table 1, a reconfigured group $G_1$ includes four STAs STA 1, STA 2, STA 5, and STA 7, the transport stream numbers for the respective STAs correspond to 3, 2, 1, and 1, respectively, and the total transport stream number of the group $G_1$ is 7. A reconfigured group $G_2$ includes four STAs STA 1, STA 3, STA 6, and STA 8, and the transport stream numbers for the respective STAs correspond to 2, 2, 1, and 3, respectively, and the total transport stream number of the group $G_2$ is 8. A reconfigured group $G_3$ includes two STAs STA 3 and STA 6, and the transport stream numbers for the respective STAs correspond to 1 and 4, respectively, and the total transport stream number of the group $G_3$ is 5.

TABLE 1

|  | Initial stream number (FIG. 7A) | Reconfigured group $G_1$ stream number | Reconfigured group $G_2$ stream number | Reconfigured group $G_3$ stream number |
| --- | --- | --- | --- | --- |
| STA 1 stream number | 4 | 3 | 2 | 0 |
| STA 2 stream number | 4 | 2 | 0 | 0 |
| STA 3 stream number | 4 | 0 | 2 | 1 |
| STA 4 stream number | 4 | 0 | 0 | 0 |
| STA 5 stream number | 4 | 1 | 0 | 0 |
| STA 6 stream number | 4 | 0 | 1 | 4 |
| STA 7 stream number | 4 | 1 | 0 | 0 |
| STA 8 stream number | 4 | 0 | 3 | 0 |
| Sum | 32 | 7 | 8 | 5 |

After the groups are reconfigured by using the channel information and the size of data to be transmitted, the information on the reconfigured groups is contained in the common signal as indicated by reference numeral 504 of FIG. 5, and the data frames are then transmitted to the respective STAs. Reference numeral 504 of FIG. 5 indicates that data to be simultaneously transmitted to STAs within a group are configured as one PHY data unit (PDU) and then transmitted. However, when the PDU is transmitted to a plurality of STAs, a plurality of PDUs as shown in FIG. 8 may be used.

Figure 8:
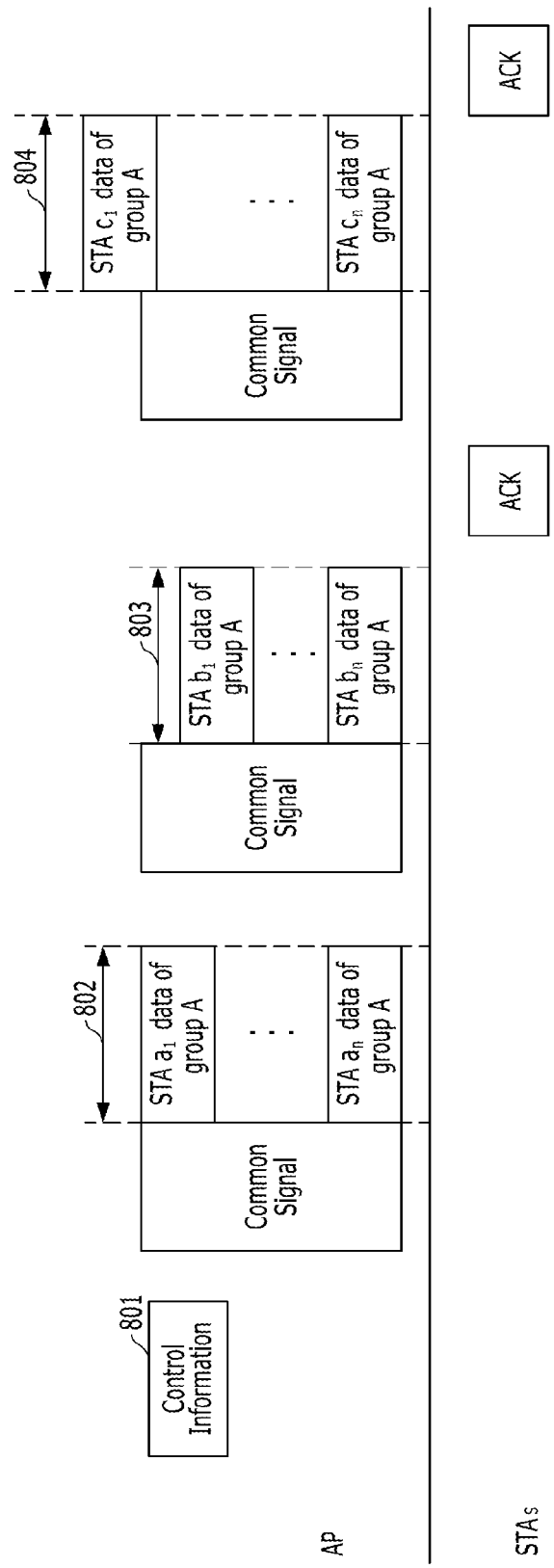
FIG. 8 is a diagram explaining a process of transmitting a plurality of PPDUs configured as STAs included in one group, in accordance with the embodiment of the present invention.

FIG. 8 is a diagram explaining a process of transmitting a plurality of PPDUs (PLCP (Physical Layer Convergence Procedure) Protocol Data Unit) configured as STAs included in one group. FIG. 8 shows a case in which three PPDUs are transmitted.

For example, when it is assumed that a group A in FIG. 8 corresponds to the reconfigured group $G_1$ of Table 1, the transport stream numbers of the respective STAs, which are included in a control information frame 801, may be expressed as shown in Table 2. The AP transmits the transport stream numbers of the respective STAs within the group through the control information frame 801. Then, the AP may change the transport stream numbers of the respective STAS for each PPDU within the transmitted transport stream numbers of the respective STAs within the group, and transmit the plurality of PPDUs as shown in FIG. 8.

TABLE 2

|  | Stream number contained in control information 801 | Stream number contained in PPDU 1 802 | Stream number contained in PPDU 2 803 | Stream number contained in PPDU 3 803 |
| --- | --- | --- | --- | --- |
| STA 1 stream number | 3 | 2 | 3 | 0 |
| STA 2 stream number | 2 | 2 | 2 | 1 |
| STA 3 stream number | 0 | 0 | 0 | 0 |
| STA 4 stream number | 0 | 0 | 0 | 0 |
| STA 5 stream number | 1 | 1 | 1 | 1 |
| STA 6 stream number | 0 | 0 | 0 | 0 |
| STA 7 stream number | 1 | 0 | 1 | 1 |
| STA 8 stream number | 0 | 0 | 0 | 0 |
| Sum | 7 | 5 | 7 | 3 |

In FIG. 8, a PPDU 1 802 represents a first PPDU which is transmitted to the STAs 1, 2, 5, and 7 belonging to the group A, and the transport stream numbers for the respective STAs in the PPDU 1 802 correspond to 2, 2, 1, and 0, respectively, as shown in Table 2. No stream is transmitted to the STA 7. A PPDU 2 803 represents a second PPDU which is transmitted to the STAs 1, 2, 5, and 7 belonging to the group A, and the transport stream numbers for the respective STAs in the PPDU 2 803 correspond to 2, 2, 1, and 1, respectively, as shown in Table 2. A PPDU 3 804 represents a third PPDU which is transmitted to the STAs 1, 2, 5, and 7 belonging to the group A, and the transport stream numbers for the respective STAs in the PPDU 1 802 correspond to 0, 1, 1, and 1, respectively, as shown in Table 2. No stream is transmitted to the STA 1.

Figure 9:
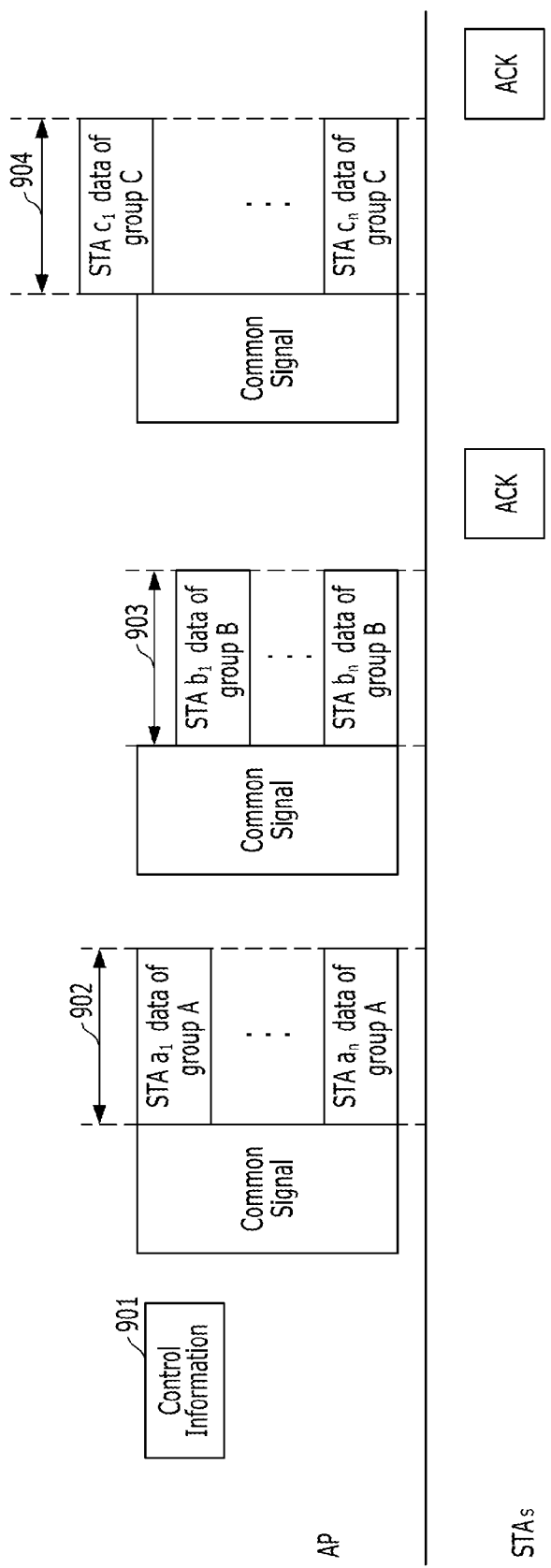
FIG. 9 is a diagram explaining a process of transmitting a plurality of PPDUs configured as STAs included in a plurality of groups, in accordance with the embodiment of the present invention.

FIG. 9 is a diagram explaining a process of transmitting a plurality of PPDUs configured as STAs included in a plurality of groups, in accordance with the embodiment of the present invention. FIG. 9 shows that three PPDUs are transmitted.

In FIG. 9, the configuration information of three groups and transport stream numbers of STAs within each of the groups are transmitted through a control information frame 901. Then, the AP transmits the PPDUs to the STAs for the respective groups during a PPDU transmission period. In FIG. 9, a common signal of each PPDU includes the transport stream numbers of STAs composing a group. The transport stream numbers of the STAs for each group may be changed within the transport stream numbers of the STAs within each group which are decided through group reconfiguration.

In FIG. 9, a PPDU 1 902 represents a PPDU which is transmitted to STAs belonging to a group A, a PPDU 2 903 represents a PPDU which is transmitted to STAs belonging to a group B, and a PPDU 3 904 represents a PPDU which is transmitted to STAs belonging to a group C.

Figure 10:
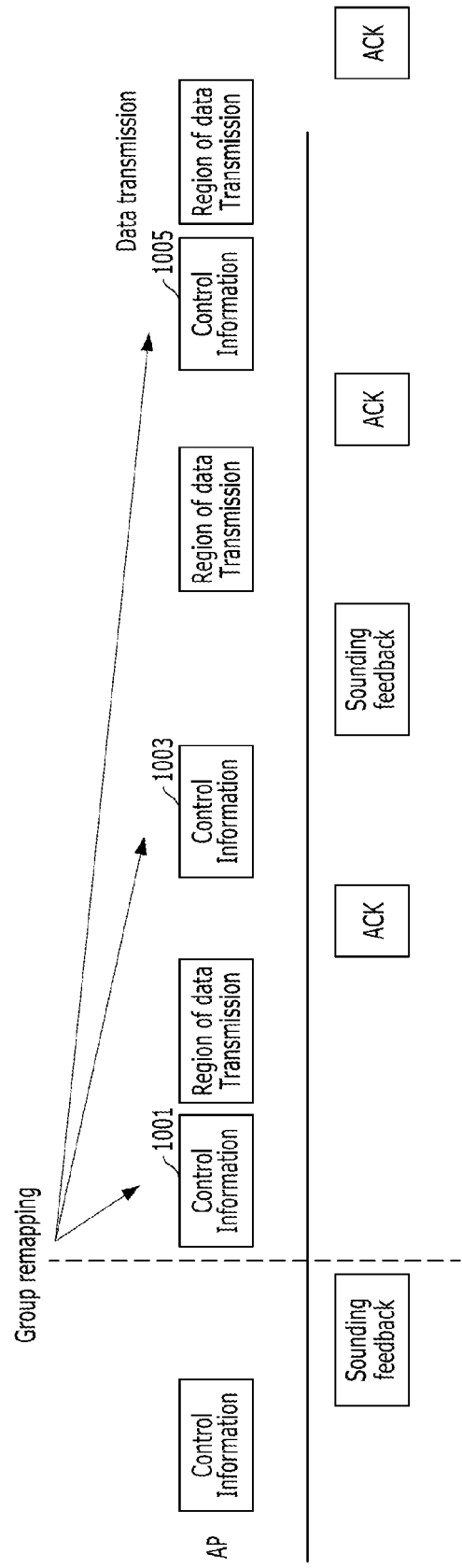
FIG. 10 is a diagram explaining a transmission time point at which reconfigured group information is transmitted to the respective STAs, in accordance with the embodiment of the present invention.

Meanwhile, the reconfigured group information does not need to be transmitted at every time before transmission of data frames. FIG. 10 is a diagram explaining a transmission time point at which the reconfigured group information is transmitted to the respective STAs, in accordance with the embodiment of the present invention.

Referring to FIG. 10, a control information frame containing the reconfigured group information may be transmitted at any one of time points 1001, 1003, and 1005 corresponding to arbitrary time points before data transmission.

When the stream number of STAs within a group requesting channel sounding or channel feedback is smaller than the number of streams which may be simultaneously transmitted by the AP, initially-configured group information may be applied to data frame transmission, without group reconfiguration.

Figure 11:
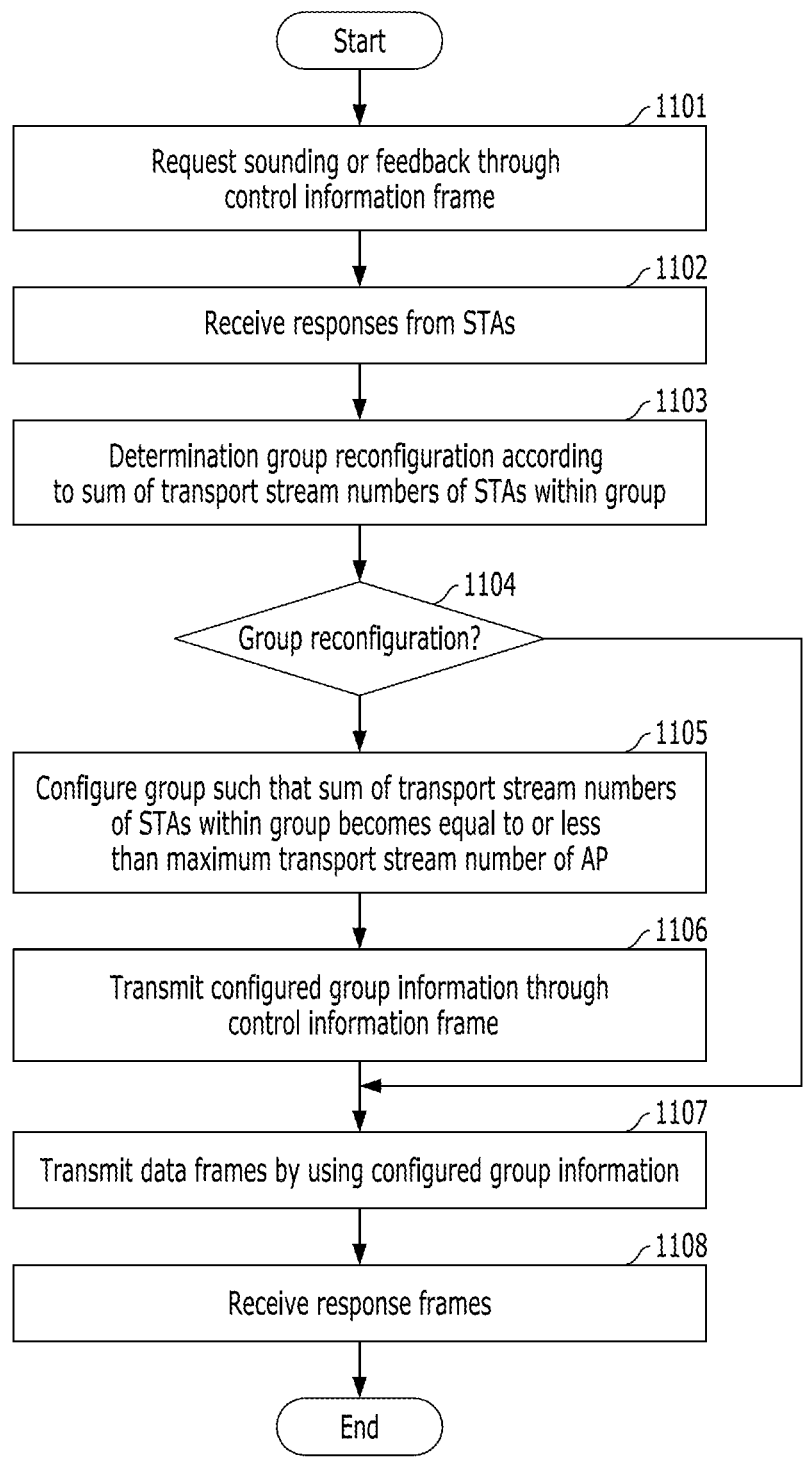
FIG. 11 is a flow chart explaining a method for transmitting data frames to multiple users in accordance with the embodiment of the present invention.

FIG. 11 is a flow chart explaining a method for transmitting data frames to multiple STAs in accordance with the embodiment of the present invention.

First, an AP configures a group for STAs existing within its region, and requests sounding or feedback for the STAs within the group through a control information frame at step S1101. At this time, the control information frame includes a group ID Group ID, IDs of the STAs composing the group, and maximum numbers of streams which may be transmitted by the respective STAs. Furthermore, the AP receives channel information in response to the sounding or feedback request from the STAs composing the group at step S1102.

Then, the AP determines whether or not to perform group reconfiguration by checking whether or not the sum of the stream numbers of the respective STAs composing the group is equal to or less than the total number of streams which may be transmitted by the AP, at step S1103. When the sum of the stream numbers of the respective STAs composing the group is equal to or less than the total number of streams which may be transmitted by the AP, it is determined that the group reconfiguration is not required. When the group reconfiguration is not required at step S1104, bits indicating the initial group ID and the transport stream numbers for the respective STAs, which have been contained in the control information frame, are contained in a common signal to transmit data frames, at step S1107. Then, the AP receives response frames from the respective STAs at step S1108.

Meanwhile, when the sum of the stream numbers of the respective STAs composing the group is larger than the total number of streams which may be transmitted by the AP, it is determined that the group reconfiguration is required, at the step S1103. When the group reconfiguration is required at the step S1104, the AP decides STAs suitable for simultaneous transmission and the stream numbers of the respective STAs by considering the channel information and the size of data to be transmitted, and then reconfigures the group, at step S1105. At this time, the AP remaps the STAs composing the initial group such that the sum of the stream numbers of the respective STAs composing the group becomes equal to or less than the maximum transport stream number of the AP, and reconfigures the group into a plurality of groups.

After the group is reconfigured for the STAs composing the initial group, a reconfigured group ID and transport stream numbers of the respective STAs are transmitted to the STAs through the control information frame at step S1106. The control information frame containing the reconfigured group ID, the information of the STAs composing the group, and the transport stream numbers of the respective STAs may be transmitted at an arbitrary time before data transmission. Then, bits representing the reconfigured group ID and the transport stream numbers of the respective STAs are contained in the common signal to transmit data frames, at step S1107. At this time, a plurality of PPDUs whose destinations are set to a plurality of STAs may be transmitted as described with reference to FIG. 8, or a plurality of PPDUs whose destinations are set to a plurality of groups may be transmitted as described with reference to FIG. 9. Then, the AP receives response frames from the respective STAs at step S1108.

Meanwhile, when the sum of the transport stream numbers of STAs within the group requesting sounding or feedback is smaller than the number of streams which may be simultaneously transmitted by the AP, the group information may be directly applied to the data frame transmission, without group reconfiguration.

In accordance with the embodiment of the present invention, it is possible to reduce the number of bits representing the group ID and the transport stream numbers of the respective STAs, which correspond to information required by the common signal of the data transmission region. Hereinafter, this will be described in detail.

Figure 12:
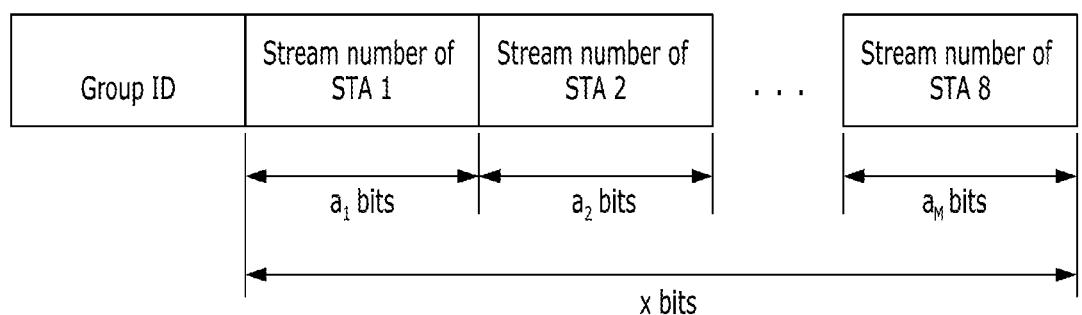
FIG. 12 is a diagram explaining a bit number required for expressing the transport stream number of each user, which is contained in a common signal, in accordance with the embodiment of the present invention.

FIG. 12 is a diagram explaining a bit number required for expressing the transport stream number for each STA which is contained in the common signal, in accordance with the embodiment of the present invention.

In FIG. 12, $a_m$ represents a bit number required for expressing the transport stream number of an m-th STA, and decided by considering the transport stream number of each STA within a reconfigured group and a case in which no stream is transmitted. For example, since the transport stream number of the STA STA1 in Table 2 corresponds to three, four cases may be considered, including a case in which no stream is transmitted. In this case, two bits are required to require the four cases.

TABLE 3

| | Reconfigured group $G_1$ of Table 1 | | Data transmission region (PPDU 1 of Table 2) | |
|---|---|---|---|---|
| | Stream number | Required bit number | Stream number | Example of bit expression |
| STA 1 stream number | 3 | 2 | 2 | 10 |
| STA 2 stream number | 2 | 2 | 2 | 10 |
| STA 5 stream number | 1 | 1 | 1 | 1 |
| STA 7 stream number | 1 | 1 | 0 | 0 |
| Sum | 7 | 6 | 5 | |

In accordance with the conventional method, the number of bits required for expressing a case in which eight STAs respectively transmit four transport streams is 24. However, when the group reconfiguration is used as in the embodiment of the present invention, five bits (x=5) are required as shown in Table 3, which means that the required bit number is significantly reduced. For example, when it is assumed that the number of STAs which simultaneously transmit streams is four and the total transport stream number is eight, a largest number of bits are required in a case in which the stream numbers of the STAs are 4, 2, 1, and 1, respectively. In accordance with the embodiment of the present invention, seven bits (x=7) are required for expressing the transport stream numbers. In the conventional method, however, 24 bits are required for expressing the transport stream numbers of the STAs. Therefore, when the method in accordance with the embodiment of the present invention is used, it is possible to significantly reduce the bit number required for expressing the transport stream numbers of the respective STAs.

When channel sounding or channel feedback is requested for a large number of STAs in order to obtain multi-user diversity, a large number of bits are required for expressing a number of cases. However, in accordance with the embodiment of the present invention, it is possible to significantly reduce the bit number through group reconfiguration.

Table 4 shows an example of a required bit number depending on the transport stream number for each STA after the group reconfiguration in accordance with the embodiment of the present invention.

TABLE 4

| Transport stream number | Required bit number for each STA |
|---|---|
| 1 | 1 |
| 2 | 2 |
| 3 | 2 |
| 4 | 3 |
| 5 | 3 |
| 6 | 3 |
| 7 | 3 |
| 8 | 4 |

In the above-described embodiments, there is a limitation in that the maximum transport stream number after the group reconfiguration is equal to or less than the maximum number of streams which may be simultaneously transmitted by the AP. However, even when the maximum transport stream number is set to be larger than the maximum stream number, the bit number required for expressing the transport stream number for each STA may be increased to easily apply the embodiments of the present invention.

For example, when the maximum number of streams which may be simultaneously transmitted by the AP is eight, the sum of stream numbers of STAs within a group after group reconfiguration may be set to a value larger than eight, the total required bits may be decided as bits in a case in which a largest number of bits are required, among the combinations of the transport stream numbers of the STAs, and the number of transport streams of the data region may be set to eight or less.

Furthermore, in the above-described embodiments of the present invention, the number of STAs to which streams may be simultaneously transmitted by the AP is limited. However, even when the number of STAs to which streams may be simultaneously transmitted by the AP is not limited, the bit number required for expressing the transport stream numbers of the respective STAs may be increased to easily apply the embodiments of the present invention.

For example, in the embodiments of the present invention, it has been described that the number of STAs to which streams are simultaneously transmitted by the AP is limited to four. However, the number of STAs may be set to more than four through the group reconfiguration, the total required bits may be decided as bits in a case in which a largest number of bits are required, among the combinations of the transport stream numbers of the STAs, and the number of transport streams of the data region may be set to eight or less.

In accordance with the embodiments of the present invention, it is possible to significantly reduce the bit number required for expressing the information on the numbers of STAs and streams which are required for data demodulation in the data region, through the group reconfiguration.

While the present invention has been described with respect to the specific embodiments, it will be apparent to those skilled in the art that various changes and modifications may be made without departing from the spirit and scope of the invention as defined in the following claims.

What is claimed is:

1. A method for simultaneously transmitting data frames to a plurality of stations (STAs) in a multi-user based wireless communication system, the method comprising: requesting sounding or feedback for the plurality of STAs by using a first control information frame containing first group information; receiving responses to the sounding or feedback request; reconfiguring the plurality of STAs composing the first group into a plurality of second groups on the basis of the responses such that the sum of maximum transport streams of the respective STAs composing one group becomes equal to or less than the maximum number of streams transmitted by an access point (AP); transmitting a second control information frame containing second group information on the respective second groups to the plurality of STAs composing the first group; and transmitting data frames by using the second group information.

2. The method of claim 1, wherein, in said reconfiguring the plurality of STAs composing the first group into the plurality of second groups, the transport stream numbers of the respective STAs which are decided on the basis of channel information for each STA received in response to the sounding or feedback request and the size of data to be transmitted are used to configure the second groups such that the sum of the transport stream numbers of the respective STAs composing the one group becomes equal to or less than the maximum number of streams transmitted by the AP.

3. The method of claim 1, wherein the second group information comprises group identifiers (ID), information on a plurality of STAs composing the groups, and the maximum transport stream numbers for the respective STAs.

4. The method of claim 3, wherein the maximum transport stream numbers for the respective STAs are set to be different from each other.

5. The method of claim 3, wherein, in said transmitting the data frames by using the second group information, the group IDs and the transport stream numbers allocated to the respective STAs composing the second groups in the second group information are contained in a common signal during a data transmission period to transmit the data frames to the respective STAs, and the transport stream numbers allocated to the respective STAs are decided within the maximum transport stream numbers of the respective STAs.

6. The method of claim 5, wherein, in said transmitting the data frames by using the second group information, the data frames transmitted to the plurality of STAs composing the second groups during the data transmission period are transmitted as a plurality of plurality of PPDUs (PLCP (Physical Layer Convergence Procedure) Protocol Data Unit).

7. The method of claim 5, wherein, in said transmitting the data frames by using the second group information, a PPDU containing the data frames transmitted to the respective second groups is transmitted through a plurality of data transmission periods.

8. The method of claim 1, wherein, in said transmitting the second control information frame containing the second group information on the respective second groups to the plurality of STAs composing the first group, the second control information frame containing the second group information on the respective second groups is transmitted one time to the plurality of STAs composing the first group at an arbitrary time before the data frame transmission.

9. A method for simultaneously transmitting data frames to a plurality of STAs in a multi-user based wireless communication system, the method comprising:
receiving responses to a sounding or feedback request from the plurality of STAs; grouping the plurality of STAs on the basis of the responses such that the sum of maximum transport stream numbers of the respective STAs composing one group becomes equal to or less than the maximum number of streams transmitted by an access point (AP), and configuring one or more first groups; transmitting a control information frame containing information on the first groups to the plurality of STAs; and transmitting data frames by using the information on the first groups.

10. The method of claim 9, wherein the information on the first groups comprises group IDs, information on a plurality of STAS composing each of the groups, and the maximum transport stream numbers of the respective STAs.

11. The method of claim 10, wherein the maximum transport stream numbers of the respective STAs are set to be different from each other.

12. The method of claim 10, wherein, in said grouping the plurality of STAs on the basis of the responses, the transport stream numbers of the respective STAs which are decided on the basis of channel information for each STA received in response to the sounding or feedback request and the size of data to be transmitted are used to configure the one or more first groups such that the sum of the transport stream numbers of the respective STAs composing the one group becomes equal to or less than the maximum number of streams transmitted by the AP.

13. The method of claim 10, wherein, in said transmitting the data frames by using the information on the first groups, the group IDs and the transport stream numbers allocated to the respective STAs composing each of the first groups in the first group information are contained in a common signal during a data transmission period to transmit the data frames to the respective STAs, and the transport stream numbers allocated to the respective STAs are decided within the maximum transport stream numbers of the respective STAs.

14. The method of claim 13, wherein, in said transmitting the data frames by using the information on the first group, the data frames transmitted to the plurality of STAs composing the first groups are transmitted as a plurality of PPDUs during the data transmission period.

15. The method of claim 13, wherein, in said transmitting the data frames by using the information on the first groups, a PPDU containing the data frames transmitted to each of the first groups is transmitted through a plurality of data transmission periods.

16. The method of claim 10, wherein, in said transmitting the control information frame containing information on the first groups to the plurality of STAs, the control information frame containing the information on the first groups is transmitted one time to the plurality of STAs composing the first groups at an arbitrary time before the data frame transmission.

* * * * *